US 9,157,488 B2

(12) United States Patent
Miyazaki et al.

(10) Patent No.: US 9,157,488 B2
(45) Date of Patent: Oct. 13, 2015

(54) CLUTCH APPARATUS

(71) Applicant: HONDA MOTOR CO., LTD., Tokyo (JP)

(72) Inventors: Jun Miyazaki, Wako (JP); Taito Kobayashi, Wako (JP); Akira Tokito, Wako (JP); Yoshinobu Shiomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 13/752,727

(22) Filed: Jan. 29, 2013

(65) Prior Publication Data

US 2013/0256082 A1     Oct. 3, 2013

(30) Foreign Application Priority Data

Mar. 29, 2012  (JP) ................. 2012-075791
Mar. 29, 2012  (JP) ................. 2012-075792
Mar. 29, 2012  (JP) ................. 2012-075793

(51) Int. Cl.
  *F16D 13/54*  (2006.01)
  *F16D 13/56*  (2006.01)

(52) U.S. Cl.
  CPC ........... *F16D 13/54* (2013.01); *F16D 13/56* (2013.01); *F16D 2013/565* (2013.01)

(58) Field of Classification Search
  CPC ... F16D 13/54; F16D 13/56; F16D 2013/565; F16D 13/04

USPC ............. 192/70.23, 54.5, 89.26, 103 C
See application file for complete search history.

(56) References Cited

U.S. PATENT DOCUMENTS

| 2009/0242349 A1* | 10/2009 | Miyazaki et al. | ............ 192/70.2 |
| 2009/0260942 A1* | 10/2009 | Matsuda | ............ 192/54.52 |
| 2010/0078286 A1* | 4/2010 | Gokan et al. | ............ 192/70.23 |
| 2013/0025997 A1* | 1/2013 | Kataoka et al. | ............ 192/70.23 |

FOREIGN PATENT DOCUMENTS

JP     2011-190885 A     9/2011

* cited by examiner

*Primary Examiner* — Robert Hodge
*Assistant Examiner* — Ryan Dodd
(74) *Attorney, Agent, or Firm* — Birch, Stewart, Kolasch & Birch, LLP

(57) ABSTRACT

A clutch apparatus including a compressive force boosting member for biasing a presser plate in a direction to compress friction plates between a pressure bearing plate and the presser plate upon accelerated rotation of a clutch inner member. A movable cam member is formed independently wherein the machinability thereof is enhanced. A compressive force boosting member includes a cam mechanism. The movable cam member is separate from a clutch inner member and a movable spring retainer member for movement independent of said clutch inner member in response to accelerated rotation of the clutch inner member. A pressure bearing plate is fixed to a clutch inner member rotatable relatively to an output shaft. A plurality of bosses extending through a presser plate have respective ends affixed thereto. A back torque limiter member has a cam mechanism disposed between a clutch inner member and an output member.

25 Claims, 8 Drawing Sheets

CLUTCH APPARATUS

CROSS-REFERENCE TO RELATED APPLICATIONS

The present application claims priority under 35 USC 119 to Japanese Patent Application No. 2012-075792 filed Mar. 29, 2012, Japanese Patent Application No. 2012-075791 filed Mar. 29, 2012 and Japanese Patent Application No. 2012-075793 filed Mar. 29, 2012 the entire contents of that are hereby incorporated by reference.

BACKGROUND OF THE INVENTION

1. Field of the Invention

The present invention relates to a clutch apparatus having a clutch outer member linked and coupled to an input member, a clutch inner member linked and coupled to an outer member, a plurality of drive friction plates engaging the clutch outer member, a plurality of driven friction plates interleaved with the drive friction plates and engaging the clutch inner member, a pressure bearing plate disposed in confronting relation to one of the drive friction plates and the driven friction plates that is disposed at an end along an axial direction of the clutch inner member, a presser plate sandwiching the drive friction plates and the driven friction plates between itself and the pressure bearing plate, clutch springs for exerting a biasing force to bias the presser plate to compress the drive friction plates and the driven friction plates between the presser plate and the pressure bearing plate, and a compressive force boosting means for boosting the biasing force applied from the clutch springs to the presser plate in response to accelerated rotation of the clutch inner member.

A plurality of first clutch springs can be disposed between a first spring retainer immovable relatively to the pressure bearing plate in the axial direction and the presser plate, for biasing the presser plate to compress the drive friction plates and the driven friction plates between the presser plate and the pressure bearing plate. In addition, a plurality of second clutch springs can be disposed between a second spring retainer movable relatively to the pressure bearing plate in the axial direction and nonrotatable relatively to the presser plate and the presser plate, for biasing the presser plate to compress the drive friction plates and the driven friction plates between the presser plate and the pressure bearing plate. A compressive force boosting means can be provided having a cam mechanism disposed between the clutch inner member and the output shaft and having a movable cam member as one of components thereof, for actuating the second spring retainer to boost biasing forces of the second clutch springs depending on movement of the movable cam member in response to accelerated rotation of the clutch inner member.

A back torque limiter means is provided for moving the presser plate away from the pressure bearing plate when a drive force from the output member is greater than a drive force from the input member.

2. Description of Background Art

Japanese Patent Laid-Open No. 2011-190885 discloses a known clutch apparatus having clutch springs disposed between a spring retainer and a presser plate that are mounted on a clutch inner member, such that the springs exert biasing forces to bias the presser plate into a compressed state, and compressive force boosting means that boosts the biasing force applied by the clutch springs to the presser plate in response to accelerated rotation of the clutch inner member by moving the clutch inner member such that the spring retainer moves toward the presser plate. The compressive force boosting means includes a fixed cam member and a movable cam member that have oblique teeth held in mesh with each other. It is difficult for the movable cam to be integrally formed with the clutch inner member to be driven in view of the rigidity and machinability of the meshing teeth. According to Japanese Patent Laid-Open No. 2011-190885, the movable cam member that is separate from the clutch inner member is fixed to the clutch inner member by rivets.

The structure disclosed in Japanese Patent Laid-Open No. 2011-190885 wherein the separate movable cam member is fixed to the clutch inner member needs fasteners such as rivets or the like. Thus, the structure is made up of an increased number of parts.

According to Japanese Patent Laid-Open No. 2011-190885, a clutch apparatus may have a plurality of first clutch springs disposed between a first spring retainer immovable relatively to a pressure bearing plate in an axial direction of a clutch inner member and a presser plate. A plurality of second clutch springs are disposed between a second spring retainer movable relatively to the pressure bearing plate in the axial direction and nonrotatable relatively to the presser plate and the presser plate. A compressive force boosting means has a movable cam member for actuating the second spring retainer to boost biasing forces of the second clutch springs in response to accelerated rotation of the clutch inner member.

The compressive force boosting means partly includes a fixed cam member and a movable cam member that have oblique teeth held in mesh with each other. Upon accelerated rotation of the clutch inner member, the movable cam member angularly moves relatively to the fixed cam member and also moves axially. According to the clutch apparatus disclosed in Japanese Patent Laid-Open No. 2011-190885, the pressure bearing plate and the fixed cam member are relatively nonrotatably coupled to the output shaft, and the movable cam member is fixed to the clutch inner member. A plurality of first bosses which extend through the presser plate have respective ends fixed to the pressure bearing plate, and the first spring retainer is mounted on the respective other ends of the first bosses. A plurality of second bosses which extend through the presser plate have respective ends fixed to the movable cam member, and the second spring retainer is mounted on the respective other ends of the second bosses. In order to prevent the first bosses and the presser plate from interfering with each other when the movable cam member is angularly moved relatively to the fixed cam member, insertion holes defined in the presser plate for the insertion of the first bosses therethrough have to be oblong in shape. The number of man-hours required to machine the presser plate is greater than if the insertion holes are circular in shape, and washers are needed to avoid adverse effects caused by frictional contact between the presser plate and the first clutch springs which bear shearing forces, resulting in an increase in the cost of the clutch apparatus.

In addition, according to Japanese Patent Laid-Open No. 2011-190885, there is known a clutch apparatus having clutch springs disposed between spring retainers on a clutch inner member and a presser plate for exerting biasing forces for biasing the presser plate into a compressed state. A back torque limiter means is provided for moving the presser plate away from a pressure bearing plate against the biasing forces from the clutch springs when a drive force from an output member is greater than a drive force from an input member. The back torque limiter means presses the clutch inner member with the presser plate to which a movable cam member serving as part of a cam mechanism is fixed.

With the structure disclosed in Japanese Patent Laid-Open No. 2011-190885 wherein the presser plate is pressed by the clutch inner member, the clutch inner member is a relatively large component and has a large inertial mass. Therefore, when a back torque is generated, since the movable cam member and the clutch inner member coupled to the movable cam member are moved by forces generated by a cam action of the cam mechanism, the timing of applying a pressing force from the clutch inner member to the presser plate possibly tends to be delayed. Thus, it is desirable to increase the response of the back torque limiter means when a back torque is generated.

SUMMARY AND OBJECTS OF THE INVENTION

The present invention has been made in view of the above problems. It is an object of an embodiment of the present invention to provide a clutch apparatus that includes an independent movable cam member that has increased machinability and also increased freedom with which to choose a material that the movable cam member is to be made of, and that is capable of avoiding an increase in the number of parts thereof.

In order to achieve the above object, there is provided in accordance with a first feature of the present invention a clutch apparatus including a clutch outer member linked and coupled to an input member, a clutch inner member linked and coupled to an output member, a plurality of drive friction plates engaging the clutch outer member, a plurality of driven friction plates interleaved with the drive friction plates and engaging the clutch inner member, a pressure bearing plate disposed in confronting relation to one of the drive friction plates and the driven friction plates that is disposed at an end along an axial direction of the clutch inner member, a presser plate sandwiching the drive friction plates and the driven friction plates between itself and the pressure bearing plate, a plurality of clutch springs for exerting a biasing force to bias the presser plate to compress the drive friction plates and the driven friction plates between the presser plate and the pressure bearing plate, and compressive force boosting means for boosting the biasing force applied from the clutch springs to the presser plate in response to accelerated rotation of the clutch inner member. The compressive force boosting means includes movable spring retainer means retaining the clutch springs under compression between the movable spring retainer means and the presser plate. A cam mechanism is disposed between the clutch inner member and the output member and includes, as one of components thereof, a movable cam member that is separate from the clutch inner member and the movable spring retainer means for movement along the axial direction independent of the clutch inner member in response to accelerated rotation of the clutch inner member. The movable cam member having an engaging member for engaging the movable spring retainer means when the movable cam member moves along the axial direction and moving the movable spring retainer means in a direction to compress the clutch springs.

According to an embodiment of the present invention, the movable cam member is in the form of a hollow cylinder disposed coaxially in the clutch outer member with an outer circumferential surface axially relatively movably and relatively nonrotatably splined to an inner circumferential surface of the clutch inner member.

According to an embodiment of the present invention, the movable spring retainer means includes a plurality of tubular bosses inserted respectively in the helical clutch springs, an annular plate integrally coupling respective ends of the bosses. A spring retainer is mounted on the other ends of the bosses held in abutment against respective ends of the clutch springs whose other ends are held in abutment against the presser plate. The engaging member for engaging an outer circumferential surface of the annular plate is disposed on and extends radially from an inner circumferential surface of the movable cam member that is of a circular cross-sectional shape.

According to an embodiment of the present invention, the movable spring retainer means includes a plurality of tubular bosses inserted respectively in the helical clutch springs, an annular plate integrally coupling respective ends of the bosses, and a spring retainer mounted on the other ends of the bosses held in abutment against respective ends of the clutch springs whose other ends are held in abutment against the presser plate. The engaging member for engaging an outer circumferential surface of the annular plate is a flange-shaped engaging member projecting radially inwardly from a full inner circumference of the movable cam member that is of a circular cross-sectional shape.

According to an embodiment of the present invention, a fixed cam member, that cooperates with the movable cam member in making up the cam mechanism, is axially relatively movably and relatively nonrotatably coupled to the output member at a position facing the movable spring retainer means in order to abut against the movable spring retainer means to limit the stroke of movement of the movable spring retainer means in a direction to compress the clutch springs when the compressive force boosting means operates.

According to an embodiment of the present invention, a sheet member made of a material different from the material of the annular plate is interposed between facing surfaces of the annular plate of the movable spring retainer means and the engaging member.

According to an embodiment of the present invention, an exchangeable shim member is interposed between facing surfaces of the annular plate of the movable spring retainer means and the engaging member.

According to an embodiment of the present invention, the other ends of the bosses of the movable spring retainer means are joined by a single joint plate shared by the bosses.

According to an embodiment of the present invention, the joint plate that serves as the spring retainer is fastened to the other ends of the bosses by fasteners threaded into the other ends of the bosses.

According to an embodiment of the present invention, the main shaft 11 corresponds to the output member, the primary driven gear 16 corresponds to the input member, the second clutch springs 25 corresponds to the clutch springs, the second spring retainer means 39A, 39B corresponds to the movable spring retainer means, the second bosses 40 corresponds to the bosses, the second joint plate 42 and the joint plate 82 correspond to the spring retainer, and the bolts 43, 83 correspond to the fasteners.

According to an embodiment of the present invention, the compressive force boosting means includes movable spring retainer means retaining the clutch springs under compression between the movable spring retainer means and the presser plate. A cam mechanism is disposed between the clutch inner member and the output member and having, as one of components thereof. A movable cam member is separate from the clutch inner member and the movable spring retainer means for movement along the axial direction independent of the clutch inner member in response to accelerated rotation of the clutch inner member. The movable cam member includes an engaging member for engaging the movable spring retainer means and for moving the movable spring retainer means. Accordingly, though the movable cam member is separate from the clutch inner member and the movable spring retainer means, no fixing parts are required to fix the movable cam member to the clutch inner member, thus avoiding an increase in the number of parts used. The movable cam member that is independent has increased machinability and also increased freedom to choose a material that the movable cam member is to be made of. It is easy to change the material of the movable cam member for increasing the rigidity thereof.

According to an embodiment of the present invention, since the movable cam member that is in the form of a hollow cylinder has an outer circumferential surface axially relatively movably and relatively nonrotatably coupled to an inner circumferential surface of the clutch inner member, the radial thickness of the movable cam member is reduced to prevent the clutch apparatus from having an increased overall outside diameter.

According to an embodiment of the present invention, the engaging member includes a plurality of engaging members for engaging an outer circumferential surface of the annular plate of the movable spring retainer means extending radially from an inner circumferential surface of the movable cam member that is of a circular cross-sectional shape. Therefore, stresses acting on the engaging members are distributed to the engaging members, making it possible to increase the rigidity of the engaging members.

According to an embodiment of the present invention, the engaging member for engaging an outer circumferential surface of the annular plate of the movable spring retainer means includes a flange-shaped engaging member projecting radially inwardly from a full inner circumference of the movable cam member that is of a circular cross-sectional shape. Therefore, stresses acting on the engaging member are distributed more widely, making it possible to increase the rigidity of the engaging member. Thus, the engaging member can be easily formed.

According to an embodiment of the present invention, a fixed cam member, that cooperates with the movable cam member in making up the cam mechanism, abuts against the movable spring retainer means to limit the stroke of movement of the movable spring retainer means in a direction to compress the clutch spring. Consequently, no special stopper structure is required to limit the stroke of movement of the movable spring retainer means, and any increase in the number of parts used is avoided.

According to an embodiment of the present invention, a sheet member is interposed between facing surfaces of the annular plate of the movable spring retainer means and the engaging member, and is made of a material different from the material of the annular plate. Therefore, the annular plate and the engaging member are prevented from being worn due to direct contact with each other.

According to an embodiment of the present invention, a replaceable shim member is interposed between facing surfaces of the annular plate of the movable spring retainer means and the engaging member. Therefore, the clearance between the annular plate and the engaging member can easily be adjusted by replacing the shim member, and the extent to which compressive forces are boosted by the compressive force boosting means can easily be adjusted by replacing the shim member.

According to an embodiment of the present invention, the other ends of the bosses of the movable spring retainer means are joined by a single joint plate shared by the bosses. Therefore, the rigidity of the bosses is increased.

According to an embodiment of the present invention, the joint plate that is fastened to the other ends of the bosses by fasteners threaded into the other ends of the bosses to make up the movable spring retainer means serves as the spring retainer. Therefore, the rigidity of the bosses is increased by the spring retainer.

The present invention has been made in view of the problems discussed above. It is an object of an embodiment of the present invention to provide a clutch apparatus that includes bosses having a first spring retainer and rotatable in unison with a presser plate for reducing the number of man-hours required to machine parts and also for reducing the cost of the clutch apparatus.

According to an embodiment of the present invention, a clutch apparatus includes a clutch outer member coupled to an input member, a clutch inner member linked and coupled to an output shaft, a plurality of drive friction plates engaging the clutch outer member, a plurality of driven friction plates interleaved with the drive friction plates and engaging the clutch inner member and a pressure bearing plate disposed in confronting relation to one of the drive friction plates and the driven friction plates that is disposed at an end along an axial direction of the clutch inner member. A presser plate sandwiches the drive friction plates and the driven friction plates between itself and the pressure bearing plate. A plurality of first clutch springs are disposed between a first spring retainer immovable relatively to the pressure bearing plate in the axial direction and the presser plate, for biasing the presser plate to compress the drive friction plates and the driven friction plates between the presser plate and the pressure bearing plate. A plurality of second clutch springs are disposed between a second spring retainer movable relatively to the pressure bearing plate in the axial direction and nonrotatable relatively to the presser plate and the presser plate, for biasing the presser plate to compress the drive friction plates and the driven friction plates between the presser plate and the pressure bearing plate. Compressive force boosting means having a cam mechanism disposed between the clutch inner member and the output shaft and having a movable cam member as one of components thereof are provided for actuating the second spring retainer to boost biasing forces of the second clutch springs depending on movement of the movable cam member in response to accelerated rotation of the clutch inner member. The pressure bearing plate is fixed to the clutch inner member that is rotatable relatively to the output shaft, a plurality of bosses extending through the presser plate have respective ends fixed to the pressure bearing plate with the first spring retainer being mounted on other ends of the bosses. The movable cam member is relatively nonrotatably and axially movably splined to the clutch inner member.

According to an embodiment of the present invention, a joint plate interconnecting the other ends of the bosses is fastened commonly to the other ends of the bosses such that they form the first spring retainer.

According to an embodiment of the present invention, a fixed cam member, which cooperates with the movable cam member in making up the cam mechanism, is relatively nonrotatably coupled to the output shaft, the pressure bearing plate is relatively rotatably fitted over the fixed cam member, with the fixed cam member having an annular bearing surface facing an end along the axial direction. A biasing member for exerting a biasing force to press the pressure bearing plate against the annular bearing surface is disposed between a bearing plate on the output shaft and the pressure bearing plate.

According to an embodiment of the present invention, the biasing force of the biasing member is greater than the biasing force exerted by the first and second clutch springs.

According to an embodiment of the present invention, the fixed cam member has a lubricating oil hole defined therein for supplying lubricating oil to a clearance between an outer circumferential surface of the fixed cam member and an inner circumferential surface of the pressure bearing surface.

According to an embodiment of the present invention, the pressure bearing plate has a lubricating oil passage for introducing lubricating oil to a splined region of the clutch inner member and the movable cam member. The biasing member that is a disc spring disposed coaxially with the output shaft is disposed in a passageway for introducing lubricating oil from the output shaft into the lubricating oil passage.

According to an embodiment of the present invention, the pressure bearing plate has a circular guide disposed around the biasing member at an open end of the lubricating oil passage near the biasing member, for guiding the lubricating oil from the biasing member.

According to an embodiment of the present invention, a fixed cam member, that cooperates with the movable cam member in making up the cam mechanism, is relatively nonrotatably coupled to the output shaft. The fixed cam member has openings defined therein through which the bosses are inserted to avoid a mutual interference between the bosses and the fixed cam member upon angular movement of the movable cam member relatively to the fixed cam member.

The main shaft 11 corresponds to the output shaft, the primary driven gear 16 corresponds to the input member, the first joint plate 37 and the spring retainer plate 81 corresponds to the first spring retainer, and the second joint plate 42 and the joint plate 82 corresponds to the second spring retainer.

According to the first feature of an embodiment of the present invention, the pressure bearing plate is fixed to the clutch inner member which is rotatable relatively to the output shaft, a plurality of bosses extending through the presser plate have respective ends fixed to the pressure bearing plate with the first spring retainer being mounted on the other ends of the bosses. The movable cam member is relatively nonrotatably and axially movably held in engagement with the clutch inner member. Therefore, the movable cam member and the pressure bearing plate are relatively nonrotatable. When the movable cam member is turned relatively to the fixed cam member, the presser plate, and the pressure bearing plate and the bosses are turned in unison with each other. There is no need for any measures for preventing the bosses and the presser plate from interfering with each other, so that the number of man-hours required to machine the components is reduced. The cost is also reduced because no washers are need to be interposed between the first clutch springs and the presser plate.

According to an embodiment of the present invention, the other ends of the bosses are interconnected by a joint plate, which provides the first spring retainer. Therefore, the rigidity of the bosses is increased, and the number of parts used is reduced as there is no need for a plurality of dedicated parts to make up the first spring retainer for each of the bosses.

According to an embodiment of the present invention, a fixed cam member, that cooperates with the movable cam member in making up the cam mechanism, is relatively nonrotatably coupled to the output shaft. The pressure bearing plate that is relatively rotatably fitted over the fixed cam member is pressed against an annular bearing surface on the fixed cam member under a biasing force of a biasing member. Therefore, even if there are dimensional differences due to machining tolerances of the pressure bearing member and the fixed cam member, the pressure bearing plate is pressed against the fixed cam member toward the presser plate to prevent the timing of engaging the clutch from being varied.

According to an embodiment of the present invention, since the biasing force of the biasing member is greater than the biasing force exerted by the first and second clutch springs, the pressure bearing plate is pressed against the fixed cam member at all times regardless of the operating state of the compressive force boosting means, preventing the timing of engaging the clutch from being varied.

According to an embodiment of the present invention, lubricating oil is supplied from a lubricating oil hole defined in the fixed cam member to a clearance between an outer circumferential surface of the fixed cam member and an inner circumferential surface of the pressure bearing surface. Therefore, the fixed cam member and the pressure bearing plate have sliding surfaces well lubricated.

According to an embodiment of the present invention, the biasing member is a disc spring disposed coaxially with the output shaft, and the disc spring is disposed in a passageway for introducing lubricating oil from the output shaft into a lubricating oil hole that is defined in the pressure bearing plate for introducing lubricating oil to an engaging region of the clutch inner member and the movable cam member. Lubricating oil thus can flow along an outer circumferential slanted surface of the disc spring into the lubricating oil passage.

According to an embodiment of the present invention, the pressure bearing plate has a circular guide disposed around the biasing member for guiding lubricating oil from the biasing member to an open end of the lubricating oil passage near the biasing member. Therefore, lubricating oil from the output shaft can efficiently be guided to the lubricating oil passage.

According to an embodiment of the present invention, the fixed cam member has openings defined therein through which the bosses are inserted to avoid a mutual interference between the bosses and the fixed cam member upon angular movement of the movable cam member relatively to the fixed cam member. The fixed cam member is thus brought into cam engagement with the movable cam member outside of the bosses, so that the fixed cam member and the second cam member can engage each other regardless of the position of the bosses.

The present invention has been made in view of the problem identified above. It is an object of the present invention to provide a clutch apparatus with a back torque limiter means having an increased response.

In order to achieve the above object, a clutch apparatus as described above is provided together with a back torque limiter means for moving the presser plate away from the pressure bearing plate when a drive force from the output member is greater than a drive force from the input member. The back torque limiter means has a cam mechanism disposed between the clutch inner member and the output member and having, as one of components thereof, a movable cam member in the form of a hollow cylinder which moves toward the presser plate independently of the clutch inner member when the drive force from the output member is greater than the drive force from the input member. The movable cam member has a hollow cylindrical extension having a presser surface on a distal end thereof, which when the movable cam member moves toward the presser plate, abuts against the presser plate and moves the presser plate away from the pressure bearing plate against the biasing forces of the clutch springs.

According to an embodiment of the present invention, the movable cam member which is disposed coaxially in the clutch inner member has an outer circumferential surface axially relatively movably and relatively nonrotatably splined to an inner circumferential surface of the clutch inner member.

According to an embodiment of the present invention, the movable cam member has, on an inner circumferential surface thereof, cam teeth held in mesh with cam teeth in the form of oblique teeth on an outer circumferential surface of a fixed cam member which is relatively nonrotatably coupled to the output member. The cam teeth on the inner circumferential surface of the movable cam member have an axial length smaller than the axial length of a splined region of the inner circumferential surface of the movable cam member and the inner circumferential surface of the clutch inner member.

According to an embodiment of the present invention, the presser plate has a plurality of tubular spring holders holding the clutch springs therein and projecting toward the fixed cam member, and pressure bearing surfaces for abutment against the presser surface of the extension, on outer circumferential surfaces of the tubular spring holders which extend in radial directions of the clutch inner member.

According to an embodiment of the present invention, the outer circumferential surface of the movable cam member that includes the extension has spline teeth held in splined engagement with the inner circumferential surface of the clutch inner member, the spline teeth having respective outer surfaces that lie flush with outer circumferential edges of flanges on an end of the extension near the presser plate to provide the presser surface which is flat.

According to an embodiment of the present invention, the spring holders have respective recesses for placing the extension therein, defined in outer circumferential surfaces thereof near the fixed cam member along the radial directions of the clutch inner member, with the pressure bearing surfaces, which are in the form of steps, being disposed on the outer circumferential surfaces of the spring holders.

According to an embodiment of the present invention, the movable cam member including the extension has lubricating oil holes defined therein which extend between outer and inner circumferential surfaces thereof, in a region aligned with the clutch inner member and the splined region of the movable cam member.

According to an embodiment of the present invention, at least part of the lubricating oil holes is defined in the movable cam member at positions aligned with the cam teeth on the inner circumferential surface of the movable cam member.

According to an embodiment of the present invention, a movable cam member serving as one of components of the cam mechanism of the back torque limiter means moves independently of the clutch inner member when a back torque is generated. A hollow cylindrical extension integrally extends from the movable cam member toward the presser plate presses the presser plate. Since the back torque limiter means is constructed to move the movable cam member which is of a relatively small inertial mass, the response of the back torque limiter means is increased when a back torque is generated.

According to an embodiment of the present invention, since the outer circumferential surface of the movable cam member is splined to the inner circumferential surface of the clutch inner member, power can be transmitted from the inner member to the outer member, and the movable cam member can be moved axially when the back torque limiter means operates.

According to an embodiment of the present invention, the axial length of the cam teeth on the inner circumferential surface of the movable cam member is smaller than the axial length of the splined region of the outer circumferential surface of the movable cam member and the inner circumferential surface of the clutch inner member. If the movable cam member and the clutch inner member are made of different materials, then the splined region has a sufficient length, and the contact surface pressure of the splined region is reduced for making the splined region rigid.

According to an embodiment of the present invention, a plurality of tubular spring holders that hold the clutch springs and project toward the fixed cam member are mounted on the presser plate. The presser surface of the extension of the movable cam member abuts against the pressure bearing surface on the outer circumferential surfaces of the spring holders along the radial directions of the clutch inner member. Therefore, the contact area of the presser plate and the pressure bearing plate can be increased for increased durability.

According to an embodiment of the present invention, the spline teeth that lie flush with the outer circumference of the flange on the end of the extension near the presser plate as the flat presser surface are disposed on the outer circumference of the movable cam member including the extension. Therefore, the flange which is the presser surface has increased rigidity.

According to the sixth feature of the present invention, the extension is placed in the recesses defined in the outer circumferential surfaces of the ends of the spring holders near the fixed cam member along the radial directions of the clutch inner member, and the recesses provide pressure bearing surfaces in the form of steps. Consequently, the presser plate is prevented from interfering with the spring holders, and the movable cam member has its thickness increased for increased rigidity.

According to an embodiment of the present invention, the lubricating oil holes defined in the movable cam member including the extension and extending between the outer and inner circumferential surfaces thereof are effective to well lubricate the splined region of the movable cam member and the clutch inner member, thereby allowing the movable cam member to operate smoothly.

According to an embodiment of the present invention, since at least part of the lubricating oil holes are defined in the movable cam member at positions aligned with the cam teeth on the inner circumferential surface of the movable cam member, the engaging part of the cam mechanism is supplied with lubricating oil to allow the cam mechanism to operate smoothly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described below with reference to the accompanying drawings.

Figure 1:
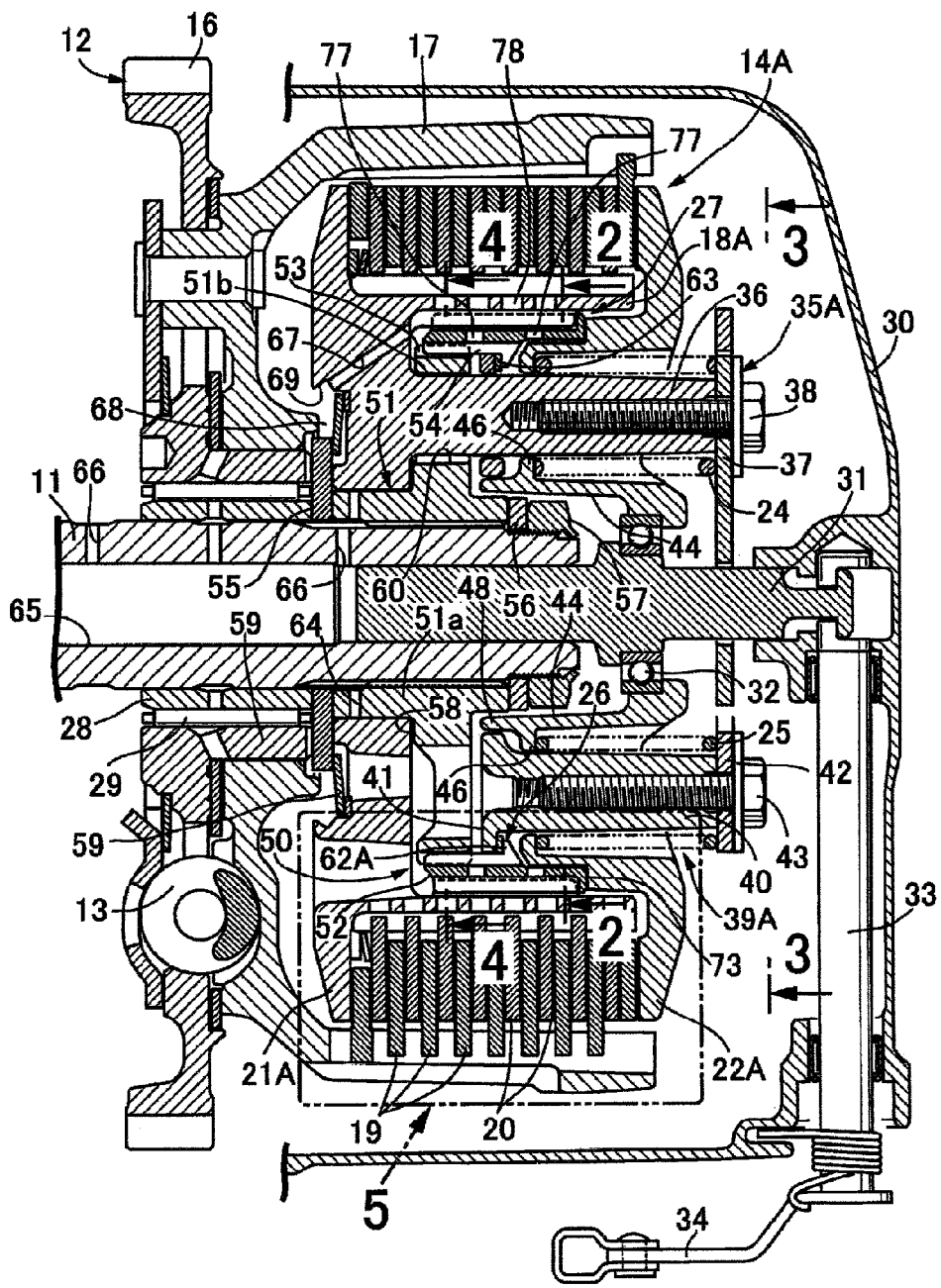
FIG. 1 is a cross-sectional view of a clutch apparatus according to a first embodiment of the present invention.

A first embodiment of the present invention will be described below with reference to FIGS. 1 through 6. As shown in FIG. 1, a primary speed reducer 12, a damper spring 13, and a clutch apparatus 14A are interposed between a crankshaft, not shown, of an engine mounted on a motorcycle, for example, and a main shaft 11 of a gear transmission, not shown. The primary speed reducer 12 includes a primary drive gear, not shown, mounted on the crankshaft and a primary driven gear 16 held in mesh with the primary drive gear. The primary driven gear 16 is relatively rotatably supported on the main shaft 11.

The clutch apparatus 14A, that is of the multiple-plate type, includes a clutch outer member 17 linked and coupled to the primary driven gear 16 that serves as an input member through the damper spring 13, a clutch inner member 18A linked and coupled to the main shaft 11 that serves as an output member, a plurality of drive friction plates 19 relatively nonrotatably engaging the clutch outer member 17, a plurality of driven friction plates 20 interleaved with the drive friction plates 19 and relatively nonrotatably engaging the clutch inner member 18A, a pressure bearing plate 21A disposed in confronting relation to one of the drive friction plates 19 and the driven friction plates 20, i.e., a drive friction plate 19, that is disposed at an end along an axial direction of the clutch inner member 18A, a presser plate 22A sandwiching the drive friction plates 19 and the driven friction plates 20 between itself and the pressure bearing plate 21A, a plurality of clutch springs, e.g., three first clutch springs 24 and three second clutch springs 25, for exerting a biasing force to bias the presser plate 22A to compress the drive friction plates 19 and the driven friction plates 20 between the presser plate 22A and the pressure bearing plate 21A, a compressive force boosting means 26 for boosting the biasing force applied from the first clutch springs 24 and the second clutch springs 25 to the presser plate 22A in response to accelerated rotation of the clutch inner member 18A, and a back-torque limiter means 27 for moving the presser plate 22A away from the pressure bearing plate 21A when a back torque is generated with a drive force from the main shaft 11 being greater than a drive force from the primary driven gear 16.

A sleeve 28 in the form of a hollow cylinder having a certain length along an axial direction of the main shaft 11 is fitted over an outer circumferential surface of the main shaft 11 aligned with the primary speed reducer 12. A needle bearing 29 is interposed between the outer circumferential surface of the sleeve 28 and the inner circumferential surface of the primary driven gear 16.

The clutch outer member 17 is of a cup shape that is open away from the primary driven gear 16, and is coupled to the primary driven gear 16 through the damper spring 13. The drive friction plates 19 have respective outer circumferential edges that axially movably and relatively nonrotatably engage the inner circumferential surface of the clutch outer member 17.

The clutch inner member 18A is in the form of a hollow cylinder disposed coaxially in the clutch outer member 17. The driven friction plates 20 have respective inner circumferential edges that axially movably and relatively nonrotatably engage the outer circumferential surface of the clutch inner member 18A. The pressure bearing plate 21A is disposed in a position interposed between the clutch outer member 17 and the clutch inner member 18A. The clutch inner member 18A has an end integrally joined to the pressure bearing plate 21A.

The clutch apparatus 14A is covered with an engine cover 30 of the engine. An operating shaft 31 has an end axially movably fitted in the engine cover 30 and another end axially slidably fitted in the main shaft 11. The presser plate 22A has an inner circumferential surface coupled to an intermediate portion of the operating shaft 31 by a clutch bearing 32. A control shaft 33 for selectively engaging and disengaging the clutch apparatus 14A is angularly movably supported in the engine cover 30. The control shaft 33 has an end projecting from the engine cover 30 and connected to a lever 34. The end of the operating shaft 31 that is fitted in the engine cover 30 is operatively coupled to an inner end of the control shaft 33 such that the operating shaft 31 will move axially when the control shaft 33 is turned about its own axis.

Figure 2:
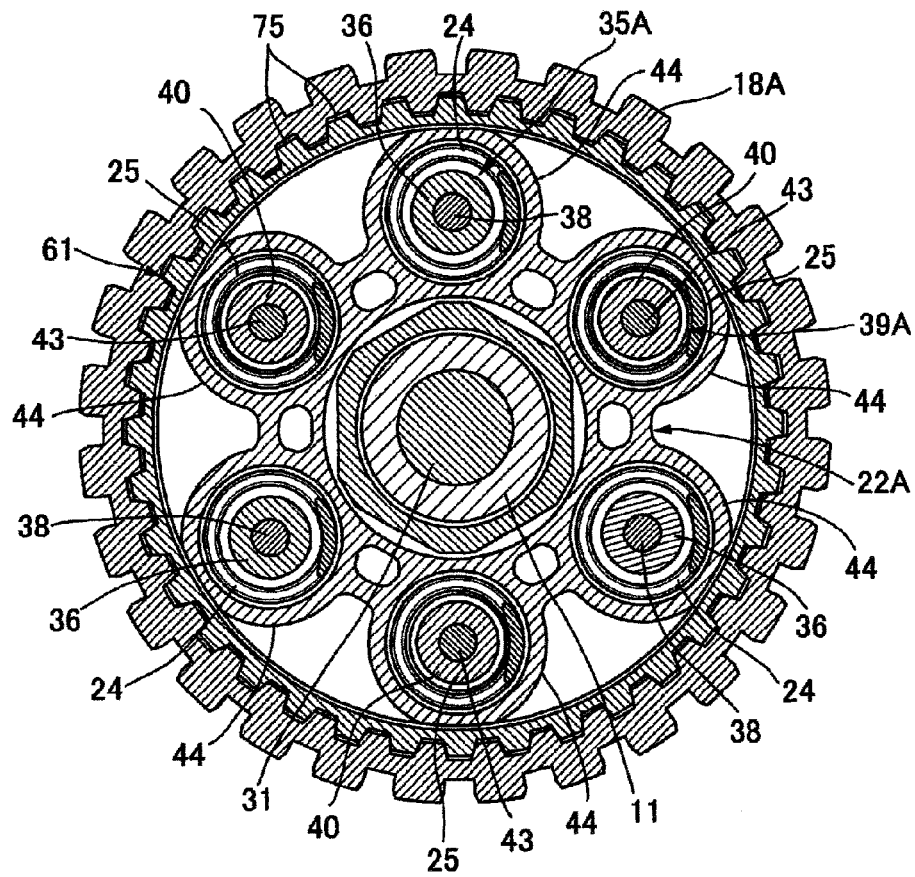
FIG. 2 is a cross-sectional view taken alone line 2-2 of FIG. 1.
Figure 3:
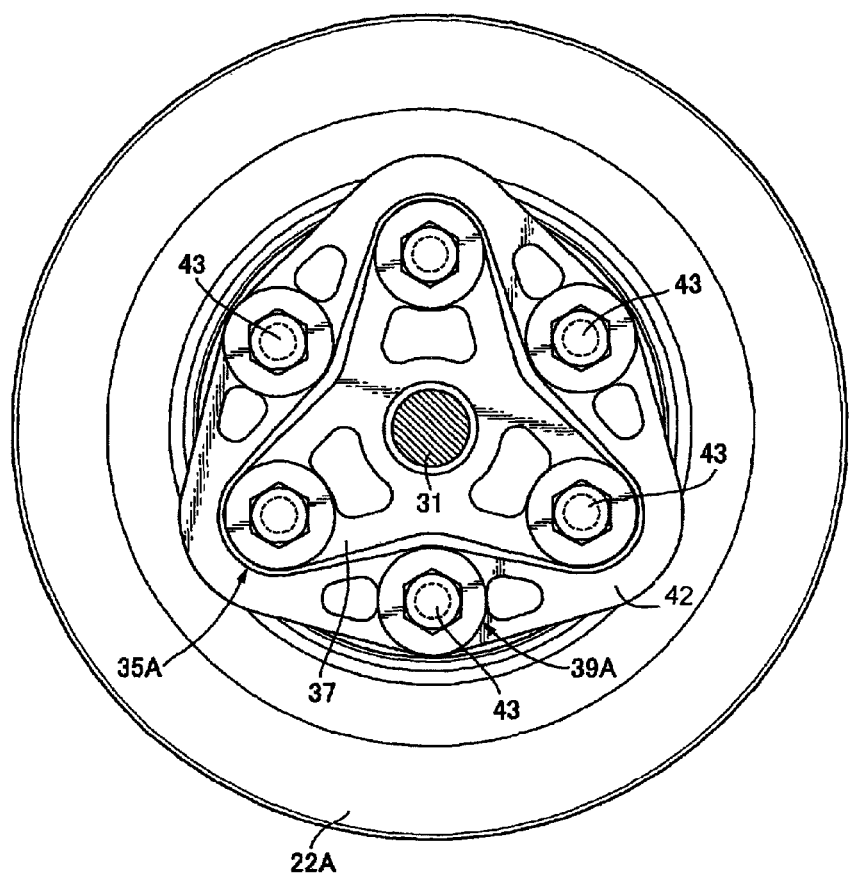
FIG. 3 is a cross-sectional view taken alone line 3-3 of FIG. 1.

As also shown in FIGS. 2 and 3, the three first clutch springs 24, angularly spaced at equal intervals circumferentially along the clutch inner member 18A, are helical springs disposed under compression between a first spring retainer means 35A and the presser plate 22A. The first spring retainer means 35A has first bosses 36 disposed inwardly of and extending parallel to the clutch inner member 18A and having respective ends integrally joined to the pressure bearing plate 21A at respective three positions that are angularly spaced at circumferentially equal intervals, and a single first joint plate 37 fastened commonly to the respective other ends of the first bosses 36. The first bosses 36 are inserted through the presser plate 22A into the first clutch springs 24. The first joint plate 37 is fastened to the other ends of the first bosses 36 by bolts 38, providing a first spring retainer for preventing the clutch inner member 18A from axially moving relatively to the pressure bearing plate 21A.

The three second clutch springs 25, positioned centrally between each first clutch spring 24 and angularly spaced at equal intervals circumferentially along the clutch inner member 18A, are helical springs disposed under compression between a second spring retainer means 39A and the presser plate 22A. The second spring retainer means 39A has second tubular bosses 40 disposed inwardly of and extending parallel to the clutch inner member 18A, an annular plate 41 integrally coupling respective ends of the second bosses 40, and a single second joint plate 42 fastened commonly to the respective other ends of the second bosses 40. The second bosses 40 are inserted through the presser plate 22A into the second clutch springs 25. The second joint plate 42 extends around the first joint plate 37 and is fastened to the other ends of the second bosses 40 by bolts 43, providing a second spring retainer for allowing the clutch inner member 18A to axially move relative to the presser plate 22A.

The presser plate 22A has a plurality of bottomed tubular spring holders 44 integrally projecting therefrom toward the pressure bearing plate 21A at six positions that are angularly spaced at equal circumferential intervals. The spring holders 44 have respective insertion holes 46 defined in respective closed ends thereof. Three of the six spring holders 44 accommodate therein the first clutch springs 24 that are compressed between the closed ends of those spring holders 44 and the first joint plate 37, and the remaining three spring holders 44 accommodate therein the second clutch springs 25 that are compressed between the closed ends of those spring holders 44 and the second joint plate 42. The first bosses 36 extend through the insertion holes 46 of the spring holders 44 that accommodate the first clutch springs 24, and the second bosses 40 extend through the insertion holes 46 of the spring holders 44 that accommodate the second clutch springs 25.

The presser plate 22A also has an annular joint 48 that commonly joins the distal ends of the spring holders 44. The annular joint 48 is inserted centrally in the annular plate 41 of the second spring retainer means 39A.

Figure 4:
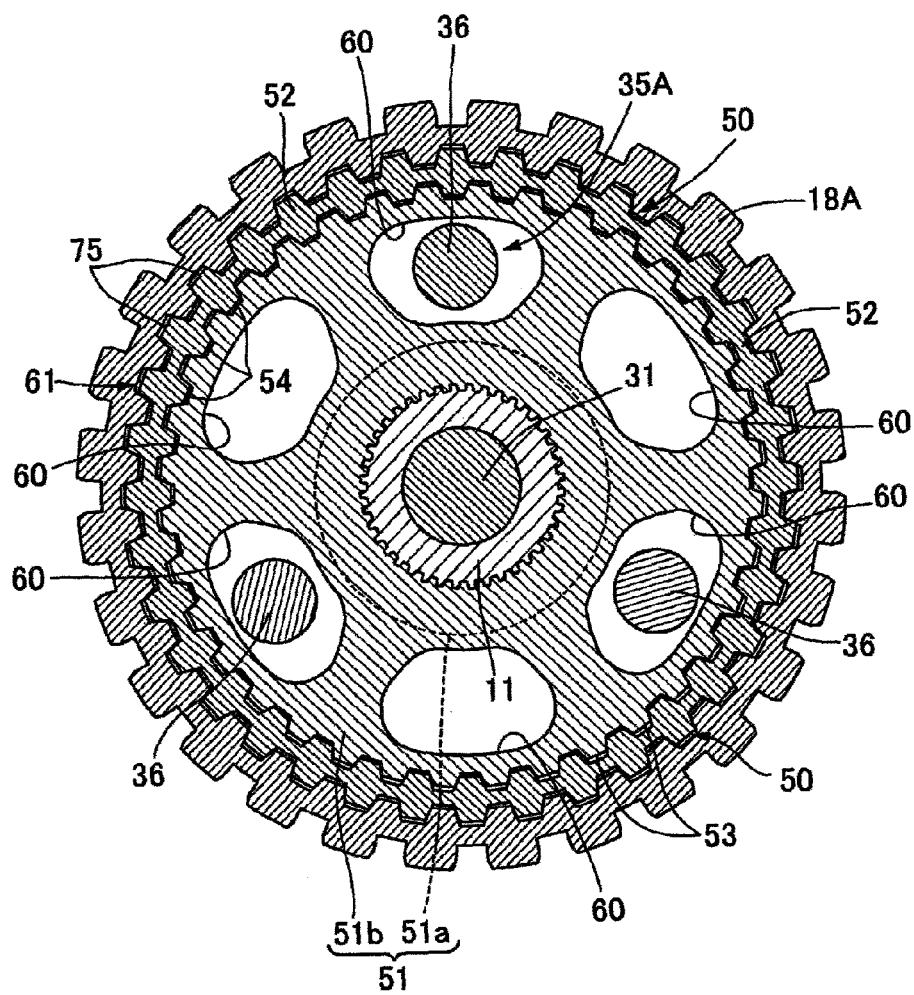
FIG. 4 is a cross-sectional view taken alone line 4-4 of FIG. 1.
Figure 5:
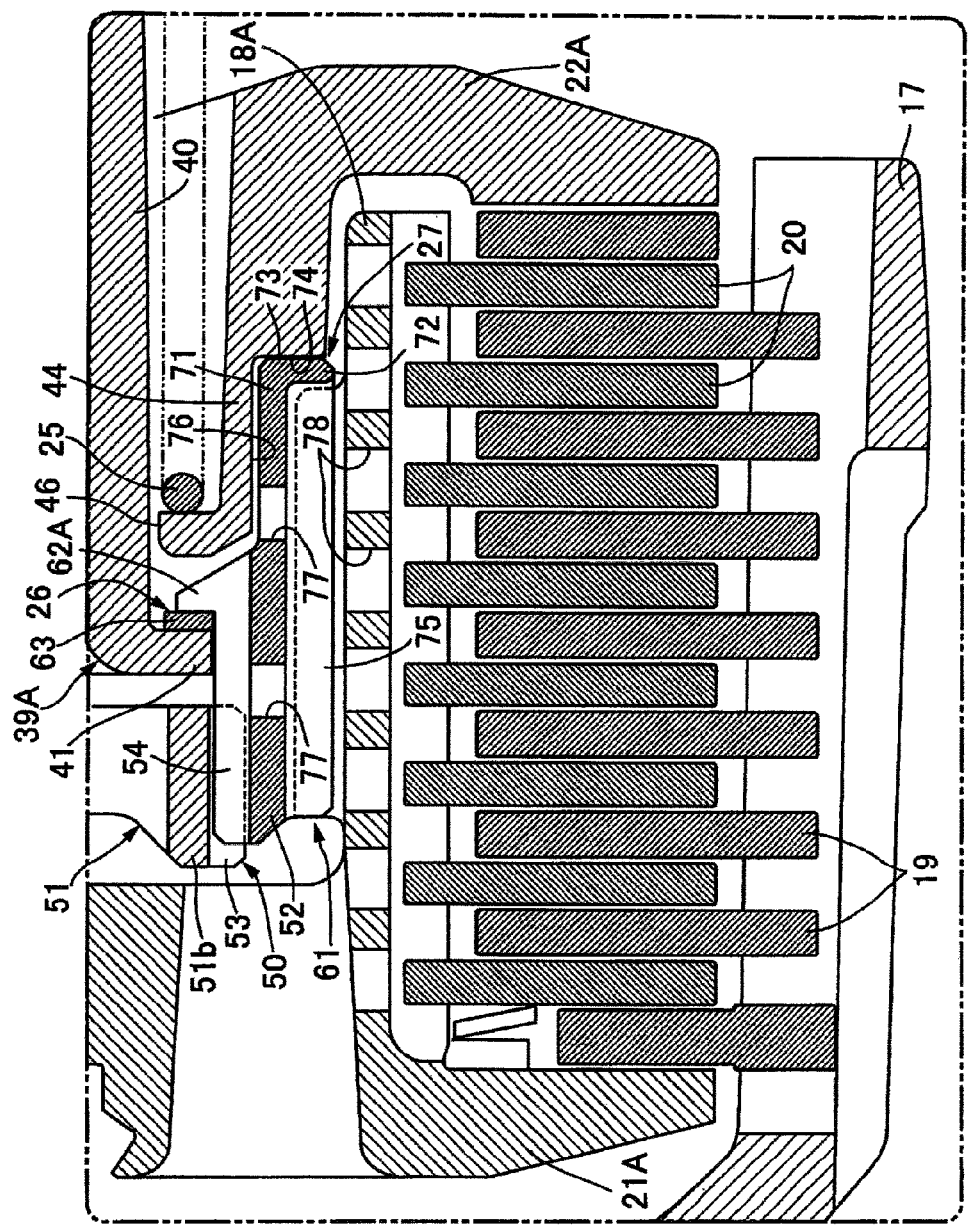
FIG. 5 is an enlarged view of an area indicated by the arrow 5 in FIG. 1.

As also shown in FIGS. 4 and 5, a cam mechanism 50 is disposed between the clutch inner member 18A and the main shaft 11. The cam mechanism 50 includes a fixed cam member 51 fixed to the main shaft 11 and having cam teeth 53 in the form of oblique teeth on an outer circumferential surface thereof, and a movable cam member 52 having cam teeth 54 on an inner circumferential surface thereof that are held in mesh with the cam teeth 53, thereby holding itself in engagement with the fixed cam member 51.

The fixed cam member 51 includes a hollow cylinder 51a splined to the main shaft 11 and a ring plate 51b integral with the hollow cylinder 51a and extending radially outwardly from an axially intermediate portion of the hollow cylinder 51a. The fixed cam member 51 is fastened to the main shaft 11 by a nut 57 threaded onto an end of the main shaft 11, with a ring-shaped bearing plate 55, the hollow cylinder 51a, and a washer 56 being sandwiched between the nut 57, and the sleeve 28 and the primary driven gear 16.

The pressure bearing plate 21A that is disposed between the bearing plate 55 and the ring plate 51b has an inner circumferential surface relatively rotatably fitted over the hollow cylinder 51a of the fixed cam member 51. A disc spring 59, that serves as a biasing member for pressing the pressure bearing member 21A against an annular bearing surface 58 on an inner circumferential portion of the ring plate 51b that faces in an axial direction of the clutch inner member 18A, is disposed between the bearing plate 55 and the pressure bearing plate 21A with a larger-diameter end of the disc spring 59 being held in abutment against the pressure bearing plate 21A.

The biasing force of the disc spring 59 is larger than the biasing force exerted by the first and second clutch springs 24, 25.

The ring plate 51b of the fixed cam member 51 has openings 60 defined therein at respective positions that are angularly spaced at equal circumferential intervals. The first bosses 36 of the first spring retainer means 35A are inserted respectively in three of the openings 60.

The cam teeth 53 of the fixed cam member 51 are disposed on the outer circumferential surface of the ring plate 51b of the fixed cam member 51. The movable cam member 52 is in the form of a hollow cylinder separate from the clutch inner member 18A and the annular plate 41 of the second spring retainer means 39A, and is disposed coaxially within the clutch inner member 18A. The movable cam member 52 has on the inner circumferential surface thereof the cam teeth 54 that are held in mesh with the cam teeth 53 of the fixed cam member 51. The cam teeth 53, 54 are oblique teeth for moving the movable cam member 52 along an axial direction of the clutch inner member 18A (to the left in FIG. 1) in response to accelerated rotation of the clutch inner member 18A.

The outer circumferential surface of the movable cam member 52 is splined to the inner circumferential surface of the clutch inner member 18A for axial relative movement but against relative rotation about the axis thereof. Upon accelerated rotation of the clutch inner member 18A, the cam mechanism 50 moves the movable cam member 52 along an axial direction of the clutch inner member 18A independently of the clutch inner member 18A. The cam teeth 54 on the inner circumferential surface of the movable cam member 52 have an axial length smaller than the axial length of a splined region 61 of the movable cam member 52 and the clutch inner member 18A.

Figure 6:
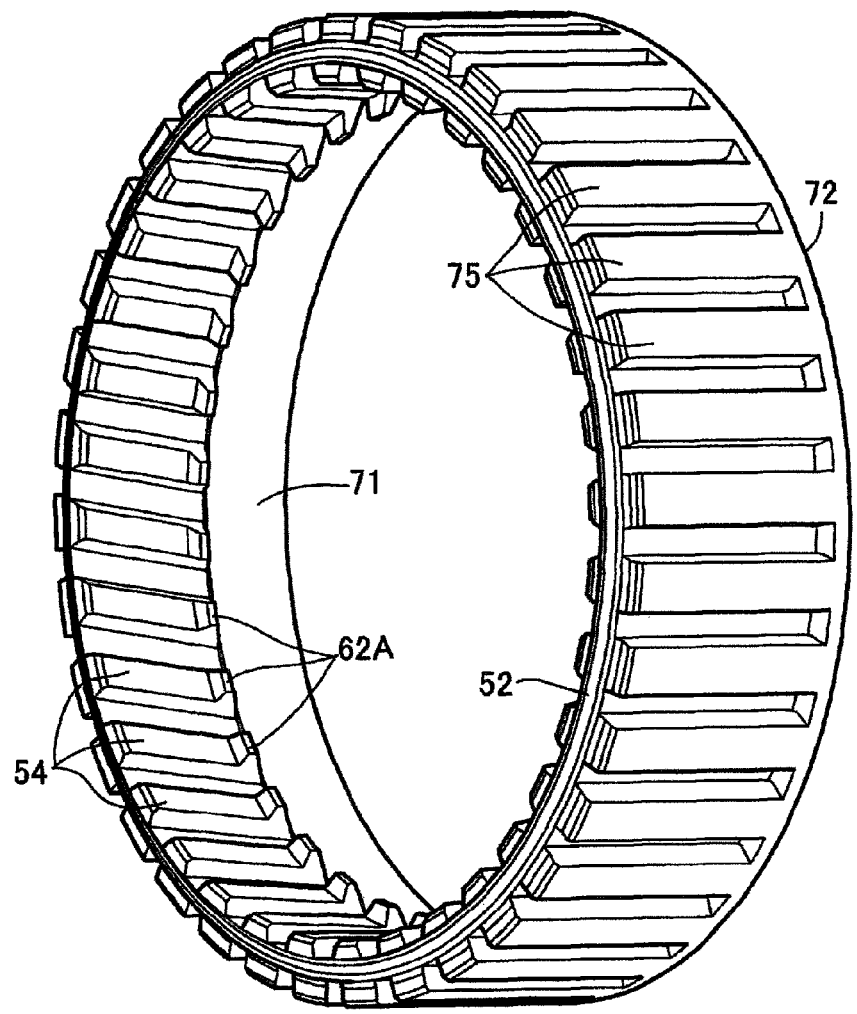
FIG. 6 is a perspective view of a movable cam member.

As also shown in FIG. 6, the compressive force boosting means 26 includes the cam mechanism 50 and engaging members 62A on the movable cam member 52 that serves as part of the cam mechanism 50. The engaging members 62A are disposed on an inner circumferential surface of the movable cam member 52 at an end thereof that faces the presser plate 22A. When the movable cam member 52 moves along an axial direction of the clutch inner member 18A in response to accelerated rotation of the clutch inner member 18A, the engaging members 62A engage an outer circumferential edge of the annular plate 41 of the second spring retainer means 39A and move the second spring retainer means 39B in a direction to compress the second clutch springs 25.

The engaging members 62A are disposed on the inner circumferential surface of the movable cam member 52 so as to extend radially from the inner circumferential surface of the movable cam member 52 at respective positions aligned with the cam teeth 54 on the inner circumferential surface of the movable cam member 52.

In addition, the annular plate 41 of the second spring retainer means 39A is made of a light metal such as aluminum alloy or the like, whereas the movable cam member 52 is made of an iron-base metal. A sheet member 63 made of a material different from the material of the annular plate 41 is interposed between facing surfaces of the annular plate 41 and the engaging members 62A. According to the first embodiment, the sheet member 63 that is of a ring shape is bonded to an outer circumferential portion of the annular plate 41.

When the compressive force boosting means 26 operates, it moves the annular plate 41 toward the fixed cam member 51 to compress the second clutch springs 25. The stroke of movement of the annular plate 41 to compress the second clutch springs 25 is limited when the annular plate 41 abuts against the fixed cam member 51 that is fixed to the main shaft 11 at a position confronting the annular plate 41.

In the cam mechanism 50, the movable cam member 52 is angularly movable relatively to the fixed cam member 51. In response to such relative angular movement of the movable cam member 52, the second bosses 40 of the second spring retainer means 39A may possibly be angularly moved about the axis of the main shaft 11 through an angle depending on the angle through that the movable cam member 52 is angularly moved. The openings 60 of the fixed cam member 51, with the second bosses 40 inserted through some of the openings 60, are sufficiently larger than the outside diameter of the second bosses 40 so that the second bosses 40 and the fixed cam member 51 will not interfere with each other when the movable cam member 52 is angularly moved relatively to the fixed cam member 51.

The hollow cylinder 51a of the fixed cam member 51 has a lubricating oil hole 64 defined therein for supplying lubricating oil to the clearance between the outer circumferential surface of the hollow cylinder 51a and the inner circumferential surface of the pressure bearing plate 21A. The main shaft 11 has a lubricating oil supply passage 65 coaxially defined therein and a plurality of oil holes 66 defined therein at axially spaced intervals. The oil holes 66 have inner ends that are open into the lubricating oil supply passage 65 and outer ends that are open at the outer circumferential surface of the main shaft 11. Lubricating oil that is introduced from one of the oil holes 66 into the clearance between the inner circumferential surface of the hollow cylinder 51a and the outer circumferential surface of the main shaft 11 is introduced through the lubricating oil hole 64 into the clearance between the outer circumferential surface of the hollow cylinder 51a and the inner circumferential surface of the pressure bearing plate 21A.

The pressure bearing plate 21A has a lubricating oil passage 67 defined therein for introducing lubricating oil into the splined region 61 of the movable cam member 52 and the clutch inner member 18A. Lubricating oil from the main shaft 11 is introduced into the lubricating oil passage 67 through the clearance between the inner circumferential surface of the sleeve 28 and the outer circumferential surface of the main shaft 11, the clearance between the bearing plate 55, and the sleeve 28 and the primary driven gear 16, an end face of the pressure bearing plate 21A, and a passageway 68. The disc spring 59 is disposed in the passageway 68 coaxially with the main shaft 11.

The pressure bearing plate 21A has a circular guide 69 disposed around the disc spring 59 at an open end of the lubricating oil passage 67 on the side of the biasing members, for guiding the lubricating oil from the disc spring 59.

When a back torque is generated with a drive force from the main shaft 11 being greater than a drive force from the primary driven gear 16, the cam mechanism 50 moves the movable cam member 52 toward the presser plate 22A in an opposite axial direction of the clutch inner member 18A (to the right in FIG. 1). The back-torque limiter means 27 includes the movable cam member 52 and a hollow cylindrical extension 71 integrally extending from the movable cam member 52 toward the presser plate 22A. The extension 71 has a flange 72 on an end thereof closer to the presser plate 22A. The flange 72 has a flat presser surface 73, that when the movable cam member 52 moves toward the presser plate 22A, contacts and presses the presser plate 22A to move the presser plate 22A away from the pressure bearing plate 21A against the spring forces of the first and second clutch springs 24, 25.

The presser plate 22A includes pressure bearing surfaces 74 for abutment against the presser surface 73, on outer circumferential surfaces of the tubular spring holders 44 that extend in radial directions of the clutch inner member 18A.

The outer circumferential surface of the movable cam member 52 that includes the extension 71 has spline teeth 75 held in splined engagement with the inner circumferential surface of the clutch inner member 18A. The spline teeth 75 have respective ends near the presser plate 22A that lie flush with the outer circumferential edges of the flanges 72.

The spring holders 44 have respective recesses 76 for placing the extension 71 therein, defined in outer circumferential surfaces thereof facing the fixed cam member 52 along the radial directions of the clutch inner member 18A, with the pressure bearing surfaces 74, that are in the form of steps, being disposed on the outer circumferential surfaces of the spring holders 44.

The movable cam member 52 and the extension 71 have a plurality of lubricating oil holes 77 defined therein that extend between outer and inner circumferential surfaces thereof, in a region aligned with the clutch inner member 18A and the splined region 61 of the movable cam member 52 and the extension 71. At least part of the lubricating oil holes 77 are defined in the movable cam member 52 at positions aligned with the cam teeth 54 on the inner circumferential surface of the movable cam member 52. The clutch inner member 18A has a plurality of lubricating oil holes 78 defined therein at axially spaced positions.

Advantages of the first embodiment will be described below. The compressive force boosting means 26 includes the second spring retainer means 39A that retains the second clutch springs 25 disposed under compression between itself and the presser plate 22A, and the cam mechanism 50 disposed between the clutch inner member 18A and the main shaft 11 and having, as one of the components thereof, the movable cam member 52 that is separate from the clutch inner member 18A and the second spring retainer means 39A for movement along an axial direction of the clutch inner member 18A independently of the clutch inner member 18A in response to accelerated rotation of the clutch inner member 18A. The movable cam member 52 has the engaging members 62A that engage the second spring retainer means 39A and moves the second spring retainer means 39A in a direction to compress the second clutch springs 25 when the movable cam member 52 moves along the axial direction of the clutch inner member 18A. Accordingly, though the movable cam member 52 is separate from the clutch inner member 18A and the second spring retainer means 39A, no fixing parts are required to fix the movable cam member 52 to the clutch inner member 18A. The movable cam member 52 that is independent has increased machinability and also increased freedom with that to choose a material that the movable cam member 52 is to be made of. It is easy to change the material of the movable cam member 52 for increasing the rigidity thereof.

The outer circumferential surface of the movable cam member 52 that is in the form of a hollow cylinder disposed coaxially in the clutch inner member 18A is splined to the inner circumferential surface of the clutch inner member 18A for axial relative movement but against relative rotation about the axis thereof. Consequently, the radial thickness of the movable cam member 52 is reduced to prevent the clutch apparatus 14 from having an increased overall outside diameter.

The second spring retainer means 39A has the second tubular bosses 40 inserted respectively in the helical second clutch springs 25, the annular plate 41 integrally coupling respective ends of the second bosses 40, and the second joint plate 42 fastened to the respective other ends of the second bosses 40 held in abutment against respective ends of the second clutch springs 25 whose other ends are held in abutment against the presser plate 22A. The engaging members 62A for engaging the outer circumferential surface of the annular plate 41 are disposed on and extend radially from the inner circumferential surface of the movable cam member 52 that is of a circular cross-sectional shape. The rigidity of the engaging members 62A is increased because stresses acting on the engaging members 62A are distributed to the engaging members 62A.

The fixed cam member 51, that cooperates with the movable cam member 52 in making up the cam mechanism 50, is axially relatively movably and relatively nonrotatably coupled to the main shaft 11 at a position facing the second spring retainer means 39A in order to abut against the annular plate 41 of the second spring retainer means 39A to limit the stroke of movement of the second spring retainer means 39A in a direction to compress the second clutch springs 25 when the compressive force boosting means 26 operates. This eliminates the need of providing a special stopper structure for restricting the movement of the second spring retainer means 39A. Thus, the number of parts can be reduced.

The sheet member 63 that is made of a material different from the material of the annular plate 41 is interposed between facing surfaces of the annular plate 41 of the second spring retainer means 39A and the engaging members 62A. The annular plate 41 and the engaging members 62A are prevented from being worn due to direct contact with each other.

Since the other ends of the second bosses 40 of the second spring retainer means 39A are joined by the second joint plate 42 that are shared by the second bosses 40, the second bosses 40 are of increased rigidity. As the second joint plate 42 is fastened to the other ends of the second bosses 40 by the bolts 43 to provide the second spring retainer, the rigidity of the second bosses 40 is increased by the second spring retainer.

The pressure bearing plate 21A is fixed to the clutch inner member 18A that is rotatable relatively to the main shaft 11. The first bosses 36 extending through the presser plate 22A have respective ends fixed to the pressure bearing plate 21A. The first joint plate 37 as the first spring retainer is mounted on the other ends of the first bosses 36, and the movable cam member 52 is relatively nonrotatably and axially movably held in engagement with the clutch inner member 18A. Therefore, the movable cam member 52 and the pressure bearing plate 21A are relatively nonrotatable. When the movable cam member 52 is turned relatively to the fixed cam member 51, the presser plate 22A, and the pressure bearing plate 21A and the first bosses 36 are turned in unison with each other. There is no need for any measures for preventing the first bosses 36 and the presser plate 22A from interfering with each other, so that the number of man-hours required to machine the components is reduced. The cost is also reduced because no washers need to be interposed between the first clutch springs 24 and the presser plate 22A.

The first joint plate 37 that joins the other ends of the first bosses 36 is fastened commonly to the other ends of the first bosses 36 to provide the first spring retainer. Therefore, the rigidity of the first bosses 36 is increased, and the number of parts used is reduced as there is no need for a plurality of dedicated parts to make up each of first spring retainers for the respective first bosses 36.

The pressure bearing plate 21A is relatively rotatably fitted over the fixed cam member 51 that cooperates with the movable cam member 52 in making up the cam mechanism 50 and that is relatively nonrotatably coupled to the main shaft 11. The fixed cam member 51 has the annular bearing surface 58 on an end thereof that faces in the axial direction of the clutch inner member 18A, and the disc spring 59, that serves as the biasing member for pressing the pressure bearing member 21A against the annular bearing surface 58, is disposed between the bearing plate 55 and the pressure bearing plate 21A that are mounted on the main shaft 11. Therefore, even if there are dimensional differences due to machining tolerances of the pressure bearing member 21A and the fixed cam member 51, the pressure bearing plate 21A is pressed against the fixed cam member 51 toward the presser plate 22A to prevent the timing of engaging the clutch from being varied.

As the biasing force of the disc spring 59 is larger than the biasing force exerted by the first and second clutch springs 24, 25, the pressure bearing plate 21A is pressed against the fixed cam member 51 at all times regardless of the operating state of the compressive force boosting means 26, preventing the timing of engaging the clutch from being varied.

The fixed cam member 51 has the lubricating oil hole 64 defined therein for supplying lubricating oil to the clearance between the outer circumferential surface of the fixed cam member 51 and the inner circumferential surface of the pressure bearing plate 21A. Lubricating oil is supplied from the lubricating oil hole 64 to the clearance between the outer circumferential surface of the fixed cam member 51 and the inner circumferential surface of the pressure bearing plate 21A for increased lubrication of sliding surfaces of the fixed cam member 51 and the pressure bearing plate 21A.

The pressure bearing plate 21A has the lubricating oil passage 67 defined therein for introducing lubricating oil into the splined region 61 of the movable cam member 52 and the clutch inner member 18A. Lubricating oil from the main shaft 11 is introduced into the lubricating oil passage 67 through passageway 68 in that the disc spring 59 is disposed coaxially with the main shaft 11. Lubricating oil thus can flow along an outer circumferential slanted surface of the disc spring 59 into the lubricating oil passage 67.

The pressure bearing plate 21A has the circular guide 69 disposed around the disc spring 59 at the open end of the lubricating oil passage 68 near the disc spring 59, for guiding the lubricating oil from the disc spring 59. Consequently, lubricating oil from the main shaft 11 is efficiently guided into the lubricating oil passage 67.

The openings 60 through that the first bosses 36 are inserted are defined in the fixed cam member 51 to avoid a mutual interference between the first bosses 36 and the fixed cam member 51 upon angular movement of the movable cam member 52 relatively to the fixed cam member 51. The fixed cam member 51 is thus brought into cam engagement with the movable cam member 52 outside of the first bosses 36, so that the fixed cam member 51 and the second cam member 52 can engage each other regardless of the position of the first bosses 36.

The back torque limiter means 27 has the cam mechanism 50 disposed between the clutch inner member 18A and the main shaft 11 and having, as one of components thereof, the movable cam member 52 in the form of a hollow cylinder that moves toward the presser plate 22A independently of the clutch inner member 18A when the drive force from the main shaft 11 is greater than the drive force from the primary driven gear 16. The movable cam member 52 has the hollow cylindrical extension 71 integrally extending from the movable cam member 52 toward the presser plate 22A and having on an end thereof the presser surface 73, that when the movable cam member 52 moves toward the presser plate 22A, abuts against the presser plate 22A to move the presser plate 22A away from the pressure bearing plate 21A against the spring forces of the first and second clutch springs 24, 25. Accordingly, the back torque limiter means 27 is constructed so as to move the movable cam member 52 that is of a relatively small inertial mass. Thus, the back torque limiter means 27 can operate with an increased response when a back torque is generated.

The outer circumferential surface of the movable cam member 52 that is disposed coaxially in the clutch inner member 18A is splined to the inner circumferential surface of the clutch inner member 18A for axial relative movement but against relative rotation about the axis thereof. Therefore, power can be transmitted from the primary driven gear 16 to the main shaft 11, and when the back torque limiter means 27 operates, the movable cam member 52 can move axially.

The movable cam member 52 has the cam teeth 54 on the inner circumferential surface thereof that are held in mesh with the cam teeth 53 in the form of oblique teeth on the outer circumferential surface of the fixed cam member 51 that is relatively nonrotatably coupled to the main shaft 11, and the axial length of the cam teeth 54 on the inner circumferential surface of the movable cam member 52 is smaller than the axial length of the splined region 61 of the outer circumferential surface of the movable cam member 52 and the inner circumferential surface of the clutch inner member 18A. Therefore, if the movable cam member 52 and the clutch inner member 18A are made of materials that are different from each other, the splined region 61 has a sufficient length, and the contact surface pressure of the splined region 61 is reduced so as to ensure rigidity.

The presser plate 22A has the tubular spring holders 44 housing the first and second clutch springs 24, 25 and projecting therefrom toward the fixed cam member 51. The presser plate 22A includes the pressure bearing surfaces 74 for abutment against the presser surface 73 of the extension 71, on the outer circumferential surfaces of the tubular spring holders 44 that extend in radial directions of the clutch inner member 18A. The contact areas of the presser surface 73 and the pressure bearing surfaces 74 can thus be increased for increased durability.

The spline teeth 75 whose outer surfaces lie flush with the outer circumferential surface of the flange 72 that is disposed on the end of the extension 71 near the presser plate 22A to provide the flat presser surface 73 are disposed on the outer circumferential surface of the movable cam member 52 including the extension 71 and held in splined engagement with the inner circumferential surface of the clutch inner member 18A. The rigidity of the flange 72 that provides the presser surface 73 is thus increased.

The recesses 76 for placing the extension 71 therein are defined in the outer circumferential surfaces of the spring holders 44 at the ends thereof near the fixed cam member 51 along the radial directions of the clutch inner member 18A, with the pressure bearing surfaces 74, that are in the form of steps, being disposed on the outer circumferential surfaces of the spring holders 44. Consequently, the movable cam member 52 is of an increased thickness for increased rigidity while keeping the presser plate 22A out of interference with the spring holders 44.

The movable cam member 52 includes the extension 71 at a section thereof corresponding to the splined region 61 where the movable cam member 52 is splined with the clutch inner member 18A, and the movable cam member 52 is provided with the lubricating oil holes 77 extending between the outer and inner circumferential surfaces thereof. Therefore, the splined region 61 of the clutch inner member 18A and the movable cam member 52 is well lubricated for smooth operation of the movable cam member 52.

At least portions of the lubricating oil holes 77 are defined in the movable cam member 52 at positions aligned with the cam teeth 54 on the inner circumferential surface of the movable cam member 52. Therefore, lubricating oil is supplied to engaging portions of the cam mechanism 50 to allow the cam mechanism 50 to operate smoothly.

Figure 7:
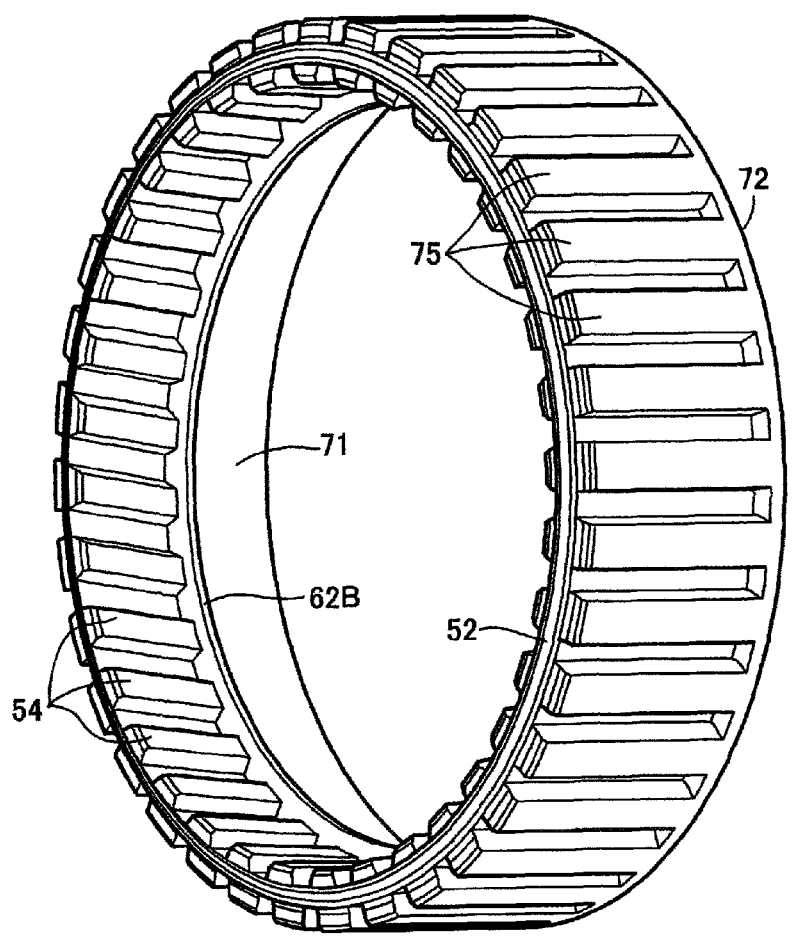
FIG. 7 is a perspective view of a movable cam member according to a second embodiment of the present invention.

A second embodiment of the present invention will be described below with reference to FIG. 7. Those parts corresponding to those of the first embodiment are denoted by identical reference characters, and will not be described in detail below.

The movable cam member 52 has a flange-shaped engaging member 62B on its full circumference that projects radially inwardly. The engaging member 62B can engage the outer circumferential surface of the annular plate 41b of the second spring retainer means 39A.

According to the second embodiment, stresses acting on the engaging member 62B are distributed more widely to increase the rigidity of the engaging member 62B, and the engaging member 62B can be formed with ease.

Figure 8:
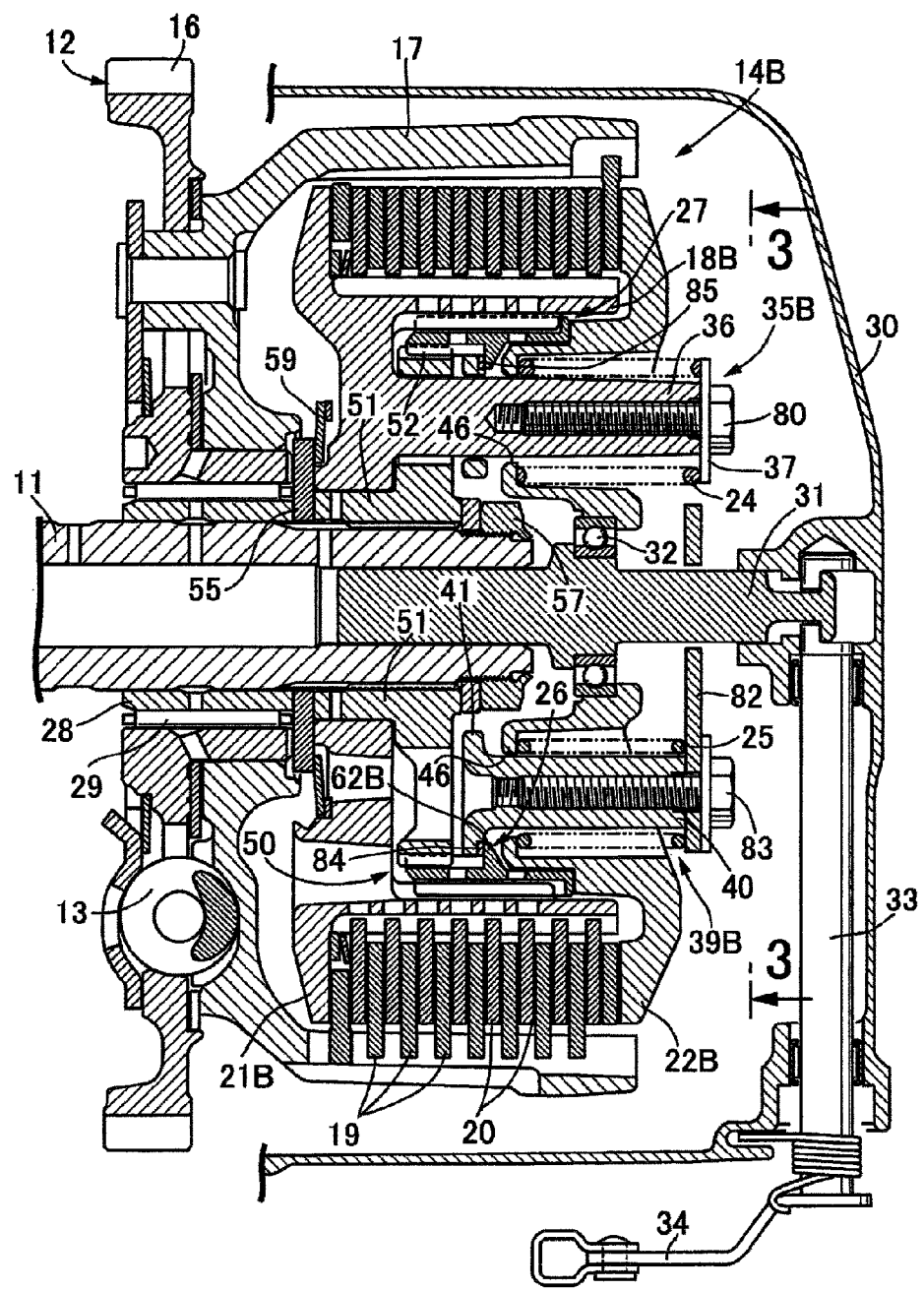
FIG. 8 is a cross-sectional view of a clutch apparatus according to a third embodiment of the present invention.

A third embodiment of the present invention will be described below with reference to FIG. 8. Those parts corresponding to those of the first embodiment are denoted by identical reference characters, and will not be described in detail below.

A clutch apparatus 14B according to the third embodiment includes a clutch inner member 18B in the form of a hollow cylinder disposed coaxially in the clutch outer member 17. The clutch inner member 18B has an end integrally joined to the pressure bearing plate 21B.

The first clutch springs 24 are helical springs disposed under compression between a first spring retainer means 35B and a presser plate 22B. The first spring retainer means 35B has first bosses 36 having respective ends integrally joined to the pressure bearing plate 21B at respective three positions that are angularly spaced at circumferentially equal intervals, and spring retainer plates 81 individually fastened to the other ends of the first bosses 36 by bolts 80. The first bosses 36 are inserted through the presser plate 22B into the first clutch springs 24, providing a first spring retainer for preventing the clutch inner member 18B from axially moving relatively to the pressure bearing plate 21B.

The second clutch springs 25 are helical springs disposed under compression between a second spring retainer means 39B and the presser plate 22B. The second spring retainer means 39B has second tubular bosses 40 disposed inwardly of and extending parallel to the clutch inner member 18B, an annular plate 41 integrally coupling respective ends of the second bosses 40, and a single joint plate 82 fastened commonly to the respective other ends of the second bosses 40. The second bosses 40 are inserted through the presser plate 22B into the second clutch springs 25. The joint plate 82 is fastened to the other ends of the second bosses 40 by bolts 83, providing a second spring retainer for allowing the clutch inner member 18B to axially move relatively to the pressure bearing plate 21B.

The presser plate 22B has bottomed tubular spring holders 44 holding the first and second clutch springs 24, 25 and integrally projecting therefrom toward the pressure bearing plate 21B. The spring holders 44 have respective insertion holes 46 defined in respective closed ends thereof. The first bosses 36 extend through the insertion holes 46 of the spring holders 44 that accommodate the first clutch springs 24, and the second bosses 40 extend through the insertion holes 46 of the spring holders 44 that accommodate the second clutch springs 25.

The cam mechanism 50 that is disposed between the clutch inner mechanism 18B and the main shaft 11 is made up of the fixed cam member 51 fixed to the main shaft 11 and the movable cam member 52 engaging the fixed cam member 51 and splined to the clutch inner member 18B. Upon accelerated rotation of the clutch inner member 18B, the cam mechanism 50 moves the movable cam member 52 along an axial direction of the clutch inner member 18B (to the left in FIG. 8). When a back torque is generated, the cam mechanism 50 moves the movable cam member 52 along an opposite axial direction of the clutch inner member 18B (to the right in FIG. 8).

The compressive force boosting means 26 includes engaging member 62B on the movable cam member 52 that serves as part of the cam mechanism 50. The engaging member 62B is disposed on an inner circumferential surface of the movable cam member 52 at an end thereof that faces the presser plate 22B. When the movable cam member 52 moves along an axial direction of the clutch inner member 18B in response to accelerated rotation of the clutch inner member 18B, the engaging member 62B engages an outer circumferential edge of the annular plate 41 of the second spring retainer means 39B and move the second spring retainer means 39B in a direction to compress the second clutch springs 25.

An exchangeable ring-shaped shim member 84 is interposed between facing surfaces of the annular plate 41 of the second spring retainer means 39B and the engaging member 62B. The shim member 84 is held by the annular plate 41 by being fitted in an annular recess 85 that is defined in the outer circumferential surface of the annular plate 41, for example.

The back-torque limiter means 27 is constructed in the same manner as with the first embodiment for bringing the presser surface 73 on the distal end of the hollow cylindrical extension 71 integral with the movable cam member 52 into abutment against the pressure bearing surfaces 74 on the outer circumferential surfaces of the spring holders 44 on the presser plate 22B that extend in the radial directions of the clutch inner member 18B.

According to the third embodiment, since the shim member 84 is interposed between the facing surfaces of the annular plate 41 of the second spring retainer means 39B and the engaging member 62B, the clearance between the annular plate 41 and the engaging member 62B can easily be adjusted by replacing the shim member 84, and the extent to that compressive forces are boosted by the compressive force boosting means 26 can easily be adjusted by replacing the shim member 84.

While the embodiments of the present invention have been described above, the present invention is not limited to the above embodiments, but various design changes can be made without departing from the scope of the present invention as recited in the claims.

For example, in the above embodiments, the compressive force boosting means 26 boosts the biasing forces of the second clutch springs 25 among the first and second clutch springs 24, 25. However, the compressive force boosting means 26 may boost the biasing forces of all the clutch springs that bias the presser plate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch apparatus comprising:
   a clutch outer member linked and coupled to an input member;
   a clutch inner member operatively connected to an output member;
   a plurality of drive friction plates engaging said clutch outer member;
   a plurality of driven friction plates interleaved with said drive friction plates and engaging said clutch inner member;
   a pressure bearing plate disposed in confronting relation to one of said drive friction plates and said driven friction plates that is disposed at an end along an axial direction of said clutch inner member;
   a presser plate sandwiching said drive friction plates and said driven friction plates between itself and said pressure bearing plate;
   a plurality of clutch springs for exerting a biasing force to bias said presser plate to compress said drive friction plates and said driven friction plates between said presser plate and said pressure bearing plate; and
   compressive force boosting means for boosting the biasing force applied from said clutch springs to said presser plate in response to accelerated rotation of said clutch inner member;
   wherein said compressive force boosting means includes movable spring retainer means retaining said clutch springs under compression between said movable spring retainer means and said presser plate, and a cam mechanism operatively connected between said clutch inner member and said output member and having, as one of components thereof, a movable cam member that is separate from said clutch inner member and said movable spring retainer means for movement along said axial direction independent of said clutch inner member in response to accelerated rotation of said clutch inner member;
   said movable cam member having an engaging member for engaging said movable spring retainer means when said movable cam member moves along said axial direction and moving said movable spring retainer means in a direction to compress said clutch springs.

2. The clutch apparatus according to claim 1, wherein said movable cam member that is in the form of a hollow cylinder disposed coaxially in said clutch inner member has an outer circumferential surface axially movably and nonrotatably splined relative to an inner circumferential surface of said clutch inner member.

3. The clutch apparatus according to claim 1, wherein said movable spring retainer means includes a plurality of tubular bosses inserted respectively in said helical clutch springs, an annular plate integrally coupling respective ends of the bosses, and a spring retainer mounted on the other ends of said bosses held in abutment against respective ends of said clutch springs whose other ends are held in abutment against said presser plate, and said engaging member for engaging an outer circumferential surface of said annular plate includes a plurality of engaging members disposed on and extending radially from an inner circumferential surface of said movable cam member that is of a circular cross-sectional shape.

4. The clutch apparatus according to claim 2, wherein said movable spring retainer means includes a plurality of tubular bosses inserted respectively in said helical clutch springs, an annular plate integrally coupling respective ends of the bosses, and a spring retainer mounted on the other ends of said bosses held in abutment against respective ends of said clutch springs whose other ends are held in abutment against said presser plate, and said engaging member for engaging an outer circumferential surface of said annular plate includes a plurality of engaging members disposed on and extending radially from an inner circumferential surface of said movable cam member that is of a circular cross-sectional shape.

5. The clutch apparatus according to claim 1, wherein said movable spring retainer means includes a plurality of tubular bosses inserted respectively in said helical clutch springs, an annular plate integrally coupling respective ends of the bosses, and a spring retainer mounted on the other ends of said bosses held in abutment against respective ends of said clutch springs whose other ends are held in abutment against said presser plate, and said engaging member for engaging an outer circumferential surface of said annular plate is a flange-shaped engaging member projecting radially inwardly from a full inner circumference of said movable cam member that is of a circular cross-sectional shape.

6. The clutch apparatus according to claim 2, wherein said movable spring retainer means includes a plurality of tubular bosses inserted respectively in said helical clutch springs, an annular plate integrally coupling respective ends of the bosses, and a spring retainer mounted on the other ends of said bosses held in abutment against respective ends of said clutch springs whose other ends are held in abutment against said presser plate, and said engaging member for engaging an outer circumferential surface of said annular plate is a flange-shaped engaging member projecting radially inwardly from a full inner circumference of said movable cam member that is of a circular cross-sectional shape.

7. The clutch apparatus according to claim 1, wherein a fixed cam member, that cooperates with said movable cam member in making up said cam mechanism, is axially movably and nonrotatably coupled relative to said output member at a position facing said movable spring retainer means in order to abut against said movable spring retainer means to limit the stroke of movement of said movable spring retainer means in a direction to compress the clutch springs when said compressive force boosting means operates.

8. The clutch apparatus according to claim 3, wherein a sheet member made of a material different from the material of said annular plate is interposed between facing surfaces of said annular plate of said movable spring retainer means and said engaging member.

9. The clutch apparatus according to claim 3, wherein an exchangeable shim member is interposed between facing surfaces of said annular plate of said movable spring retainer means and said engaging member.

10. The clutch apparatus according to claim 3, wherein said other ends of said bosses of said movable spring retainer means are joined by a single joint plate shared by said bosses.

11. The clutch apparatus according to claim 10, wherein the joint plate that serves as said spring retainer is fastened to the other ends of said bosses by fasteners threaded into the other ends of said bosses.

12. A clutch apparatus comprising:
a clutch outer member coupled to an input member;
a clutch inner member operatively connected to an output shaft
a plurality of drive friction plates engaging said clutch outer member
a plurality of driven friction plates interleaved with said drive friction plates and engaging said clutch inner member;
a pressure bearing plate disposed in confronting relation to one of said drive friction plates and said driven friction plates disposed at an end along an axial direction of said clutch inner member;
a presser plate sandwiching said drive friction plates and said driven friction plates between itself and said pressure bearing plate;
a plurality of first clutch springs being operatively connected relative to a first spring retainer and being operatively connected relative to said pressure bearing plate in said axial direction and said presser plate, for biasing said presser plate to compress said drive friction plates and said driven friction plates between said presser plate and said pressure bearing plate;
a plurality of second clutch springs being operatively connected relative to a second spring retainer and being operatively connected relative to said pressure bearing plate in said axial direction and nonrotatable relative to said presser plate, for biasing said presser plate to compress said drive friction plates and said driven friction plates between said presser plate and said pressure bearing plate; and
compressive force boosting means having a cam mechanism disposed between said clutch inner member and said output shaft and having a movable cam member as one of components thereof, for actuating said second spring retainer to boost biasing forces of said second clutch springs depending on movement of said movable cam member in response to accelerated rotation of said clutch inner member;
wherein said pressure bearing plate and said clutch inner member are rotatable relative to said output shaft, a plurality of bosses extending from said presser plate have respective ends integral with said pressure bearing plate with said first spring retainer being mounted on other ends of said bosses, and said movable cam member is nonrotatably and axially movably splined relative to said clutch inner member.

13. The clutch apparatus according to claim 12, wherein a joint plate interconnecting the other ends of said bosses is fastened commonly to the other ends of said bosses such that they form said first spring retainer.

14. The clutch apparatus according to claim 12, wherein a fixed cam member, which cooperates with said movable cam member in making up said cam mechanism, is nonrotatably coupled relative to said output shaft, said pressure bearing plate is rotatably fitted over said fixed cam member, said fixed cam member has an annular bearing surface facing an end along said axial direction, and a biasing member for exerting a biasing force to press said pressure bearing plate against said annular bearing surface is disposed between a bearing plate on said output shaft and said pressure bearing plate.

15. The clutch apparatus according to claim 14, wherein the biasing force of said biasing member is greater than the biasing force exerted by the first and second clutch springs.

16. The clutch apparatus according to claim 14, wherein said fixed cam member has a lubricating oil hole defined therein for supplying lubricating oil to a clearance between an outer circumferential surface of said fixed cam member and an inner circumferential surface of said pressure bearing surface.

17. The clutch apparatus according to claim 14, wherein said pressure bearing plate has a lubricating oil passage for introducing lubricating oil to a splined region of said clutch inner member and said movable cam member, and said biasing member being a disc spring disposed coaxially with said output shaft is disposed in a passageway for introducing lubricating oil from said output shaft into said lubricating oil passage.

18. The clutch apparatus according to claim 17, wherein said pressure bearing plate has a circular guide disposed around said biasing member at an open end of said lubricating oil passage near said biasing member, for guiding the lubricating oil from said biasing member.

19. The clutch apparatus according to claim 12, wherein a fixed cam member, which cooperates with said movable cam member in making up said cam mechanism, is nonrotatably coupled relative to said output shaft, said fixed cam member has openings defined therein through which said bosses are inserted to avoid a mutual interference between said bosses and said fixed cam member upon angular movement of said movable cam member relative to said fixed cam member.

20. A clutch apparatus comprising:
a clutch outer member coupled to an input member;
a clutch inner member operatively connected to an output member;
a plurality of drive friction plates engaging said clutch outer member;
a plurality of driven friction plates interleaved with said drive friction plates and engaging said clutch inner member;
a pressure bearing plate disposed in confronting relation to one of said drive friction plates and said driven friction plates disposed at an end along an axial direction thereof;
a presser plate sandwiching said drive friction plates and said driven friction plates between itself and said pressure bearing plate;
clutch springs for exerting a biasing force to bias said presser plate to compress said drive friction plates and said driven friction plates between said presser plate and said pressure bearing plate; and back torque limiter means for moving said presser plate away from said pressure bearing plate when a drive force from said output member is greater than a drive force from said input member;

wherein said back torque limiter means includes a cam mechanism disposed between said clutch inner member and said output member and having, as one of components thereof, a movable cam member in the form of a hollow cylinder movable toward said presser plate independently of said clutch inner member when the drive force from said output member is greater than the drive force from said input member, and said movable cam member has a hollow cylindrical extension having a presser surface on a distal end thereof, which when said movable cam member moves toward said presser plate, abuts against said presser plate and moves said presser plate away from said pressure bearing plate against the biasing forces of said clutch springs;

wherein said movable cam member disposed coaxially in said clutch inner member has an outer circumferential surface axially movably and nonrotatably splined relative to an inner circumferential surface of said clutch inner member and said movable cam member including said extension has lubricating oil holes defined therein extending between outer and inner circumferential surfaces thereof, in a region aligned with said clutch inner member and the splined region of said movable cam member.

21. The clutch apparatus according to claim 20, wherein said movable cam member includes, on an inner circumferential surface thereof, cam teeth held in mesh with cam teeth in the form of oblique teeth on an outer circumferential surface of a fixed cam member being nonrotatably coupled relative to said output member, and said cam teeth on the inner circumferential surface of said movable cam member have an axial length smaller than the axial length of a splined region of the inner circumferential surface of said movable cam member and the inner circumferential surface of said clutch inner member.

22. The clutch apparatus according to claim 21, wherein said presser plate includes a plurality of tubular spring holders holding said clutch springs therein and projecting toward said fixed cam member, said tubular spring holders including outer circumferential surfaces with pressure bearing surfaces for abutment against the presser surface of said extension.

23. The clutch apparatus according to claim 20, wherein the outer circumferential surface of said movable cam member including said extension has spline teeth held in splined engagement with the inner circumferential surface of said clutch inner member, said spline teeth having respective outer surfaces lying flush with outer circumferential edges of flanges on an end of said extension near said presser plate to provide said presser surface which is flat.

24. The clutch apparatus according to claim 22, wherein said spring holders have respective recesses for placing said extension therein, defined in outer circumferential surfaces thereof near said fixed cam member along the radial directions of said clutch inner member, with said pressure bearing surfaces, which are in the form of steps, being disposed on the outer circumferential surfaces of said spring holders.

25. The clutch apparatus according to claim 20, wherein at least part of said lubricating oil holes is defined in said movable cam member at positions aligned with said cam teeth on the inner circumferential surface of said movable cam member.

* * * * *